(12) United States Patent
Yamada et al.

(10) Patent No.: US 8,391,706 B2
(45) Date of Patent: Mar. 5, 2013

(54) OPTICAL SIGNAL DIVISION TRANSMISSION SYSTEM, OPTICAL TRANSMITTER, OPTICAL RECEIVER, AND OPTICAL SIGNAL DIVISION TRANSMISSION METHOD

(75) Inventors: Keiichi Yamada, Tokyo (JP); Tsutomu Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 768 days.

(21) Appl. No.: 12/409,806

(22) Filed: Mar. 24, 2009

(65) Prior Publication Data

US 2009/0238556 A1   Sep. 24, 2009

(30) Foreign Application Priority Data

Mar. 24, 2008  (JP) ................. 2008-076050

(51) Int. Cl.
  *G02F 1/00* (2006.01)
  *H04B 10/08* (2006.01)
  *H04B 10/04* (2006.01)
  *H04B 10/06* (2006.01)

(52) U.S. Cl. ............. 398/5; 398/23; 398/24; 398/182; 398/202

(58) Field of Classification Search ............. 398/5, 20, 398/43, 79, 82, 17, 23, 24, 182, 202
See application file for complete search history.

(56) References Cited

U.S. PATENT DOCUMENTS

| | | | | |
|---|---|---|---|---|
| 7,233,738 | B2 * | 6/2007 | Kerfoot, III | .............. 398/10 |
| 2007/0147434 | A1 | 6/2007 | Toyoda | |

FOREIGN PATENT DOCUMENTS

| | | |
|---|---|---|
| CN | 101043460 A | 9/2007 |
| JP | S60-3237 A | 1/1985 |
| JP | 1998210008 A | 8/1998 |
| JP | 2002-118540 A | 3/2002 |
| JP | 2002158838 A | 5/2002 |
| JP | 2003051811 A | 2/2003 |
| WO | 2004/040811 A1 | 5/2004 |
| WO | 2005/048520 A1 | 5/2005 |

OTHER PUBLICATIONS

Chinese Office Action for CN200910127060.9 dated Sep. 19, 2012.

* cited by examiner

*Primary Examiner* — Jack Dinh

(57) ABSTRACT

An optical signal division transmission system in which an input optical signal is divided into N parts (termed as "N-part optical signals") and transmitted at a transmission rate of 1/N, wherein an additional optical wave path is provided separately from an optical wave paths for transmitting said N-part optical signals, and even if a malfunction occurs in any one of said optical wave paths for transmitting said N-part optical signals, transmission of said N-part optical signals is continued, using said additional optical wave path.

7 Claims, 3 Drawing Sheets

OPTICAL SIGNAL DIVISION TRANSMISSION SYSTEM, OPTICAL TRANSMITTER, OPTICAL RECEIVER, AND OPTICAL SIGNAL DIVISION TRANSMISSION METHOD

This application is based upon and claims the benefit of the priority of Japanese patent application No. 2008-076050 filed on Mar. 24, 2008, the disclosure of which is incorporated herein in its entirety by reference thereto.

TECHNICAL FIELD

The present invention relates to an optical signal division transmission system, an optical transmitter, an optical receiver, and an optical signal division transmission method, and in particular, to an optical signal division transmission system, an optical transmitter, an optical receiver, and an optical signal division transmission method, in which an input optical signal is divided into N parts and transmitted at a transmission rate of 1/N.

BACKGROUND

In an optical transmission system, degradation of a main signal occurs due to wavelength dispersion in optical fiber and the like, used as a transmission line. The worse a characteristic of the optical fiber, which is the transmission line, is, and the higher a bit rate of the main signal is, the larger this degradation becomes; for example, if a high bit rate signal of 10 Gbps or 40 Gbps is transmitted by an optical fiber with a poor characteristic, this degradation is significant, and feasible transmission distance becomes short.

Consequently, a method may be used in which a client signal is divided into N parts, and, with a bit rate of 1/N, is transmitted over a long distance by N optical wave paths. For example, Patent Document 1 discloses a configuration to reduce delay time when communicating in case of using this method.

Furthermore, Patent Document 2 also discloses a configuration in which transmittable distance of high-speed, large-volume tributary signals is extended, the tributary signals are demultiplexed for separation and are transmitted in the separated mode, and the signals that have been demultiplexed are multiplexed at a receiver side to restore the tributary signals.

Furthermore, Patent Document 3 discloses a configuration which, for a transceiver for wavelength multiplexing optical transmission, to which a plurality of terminal apparatuses are respectively connected, has a transponder in a standby system that switches when an abnormality is detected.
[Patent Document 1]
  JP Patent Kokai Publication No. JP-P2003-51811A
[Patent Document 2]
  JP Patent Kokai Publication No. JP-P2002-158638A
[Patent Document 3]
  JP Patent Kokai Publication No. JP-A-10-210008

SUMMARY

The entire disclosures of the above patent documents are incorporated herein by reference thereto.

The following analyses are given by the present invention. As in the abovementioned Patent Documents 1 and 2, in a configuration for dividing a client signal by N to a bit rate of 1/N, to be transmitted by N optical wave paths, there is a problem in that, when a malfunction occurs in one of the optical wave paths, the client signal is cut, irrespective of the fact that the other optical wave paths are normal.

Furthermore, in a configuration of Patent Document 3, optical signals transmitted from a plurality of terminal apparatuses (optical transmitters) are wavelength converted by transmitting transponders, respectively, and are subject to wavelength multiplexing for transmission, and the optical transmission is performed via one optical transmission path under the wave multiplexed state. If an abnormality occurs in a certain transponder, switching is made to an avoid any transponder provided as spare. Switching on the receiving side is also necessary. Thus, the switchings of transponder and receiver are necessary to continue the transmission when malfunction has occurred. Thus, there is much to be desired in the art.

According to a first aspect of the present invention, there is provided an optical signal division transmission system in which an input optical signal is divided into N parts (termed as "N-part optical signals") and transmitted at a transmission rate of 1/N, wherein an additional optical wave path is provided separately from optical wave paths for transmitting the N-part optical signals, and, even if a malfunction occurs in any one of the optical wave paths for transmitting the N-part optical signals, it is possible to continue transmission of the N-part optical signals, using the additional optical wave path (in place of the optical wave path malfunctioned).

According to a second aspect of the present invention, there is provided an optical signal division transmission system in which an input optical signal is divided into N parts (termed as "N-part optical signals") and transmitted at a transmission rate of 1/N, wherein the system includes a malfunction judging unit that judges a state of (each of) the optical wave paths for transmitting the N-part optical signals, and an error correction data transmission structure that uses a standby optical wave path provided separately from the optical wave paths for transmitting the N-part optical signals, to transmit error correction data (signal) of the N-part optical signals, and the optical signal division transmission system has a function for error correction of the N-part optical signals, using the error correction data.

According to a third aspect of the present invention, there is provided an optical signal division transmission system in which an input optical signal is divided into N parts (N-part optical signals) and transmitted at a transmission rate of 1/N, wherein the system includes a malfunction judging unit that judges a state of any of the optical wave paths for transmitting the N-part optical signals, and an optical wave path switching structure (unit) which, in case of a malfunction occurring in the optical wave path for transmitting the N-part optical signals, uses a standby optical wave paths provided separately from the optical wave path for transmitting the N-part optical signals, to transmit a transmission signal of the optical wave path in which the malfunction occurred.

According to a fourth aspect of the present invention, there are provided an optical transmitter and an optical receiver for use in the abovementioned optical signal division transmission system.

According to a fifth aspect of the present invention, there is provided an optical signal division transmission method for an optical signal division transmission system including an optical transmitter which divides an input optical signal into N parts (termed as "N-part optical signals") to be transmitted at a transmission rate of 1/N, and an optical receiver which receives an optical signal transmitted from the optical transmitter, the method comprising: the optical transmitter dividing the input optical signal into N parts (N-part optical signals), and also generating error correction data for the N-part optical signals, to be transmitted together with the N-part optical signals; the optical receiver monitoring states of optical wave paths for receiving the N-part optical signals from the optical transmitter, and in case where a malfunction occurs in any one of the optical wave paths for receiving the N-part optical signals from the optical transmitter, uses the error correction data to execute error correction of the N-part optical signals; and the optical receiver multiplexes the N-part optical signals received from the optical transmitter or at least one of the N-part optical signals that was restored using the error correction data, to restore the input optical signal.

According to a sixth aspect of the present invention, there is provided an optical signal division transmission method for an optical signal division transmission system comprising an optical transmitter which divides an input optical signal into N parts (termed as "N-part optical signals") to be transmitted at a transmission rate of 1/N, and an optical receiver which receives the N-part optical signals transmitted from the optical transmitter; the method comprising: dividing, by the optical transmitter, the input optical signal into N-part optical signals to be transmitted; the optical receiver monitoring states of optical wave paths for receiving the N-part optical signals from the optical transmitter, and in case where a malfunction occurs in any one of the optical wave paths for receiving the N-part optical signals from the optical transmitter, the optical receiver notifies the optical transmitter to switch an optical wave path in which the malfunction occurred to a standby optical wave path(s) provided separately from the optical wave paths for transmission of the N-part optical signals, and the optical transmitter switches the optical wave path for which the malfunction occurrence was notified, to a standby optical wave path, and transmits the N-part optical signals; and die optical receiver multiplexes N-part optical signals received via the optical wave paths for transmitting the N-part optical signals or the standby optical wave path, to restore the input optical signal.

The meritorious effects of the present invention are summarized as follows.

According to the present invention, it is possible to transmit a client signal normally, even when a malfunction occurs in an optical wave path. A configuration is employed in which, separate from an optical wave path or paths for transmitting an optical signal(s) divided into N parts (N-part optical signals), a standby optical wave path is provided and used when a malfunction occurs in any one of the optical wave paths allocated for N-part optical signals.

BRIEF DESCRIPTIONS OF THE DRAWINGS

PREFERRED MODES OF THE INVENTION

Figure 1:
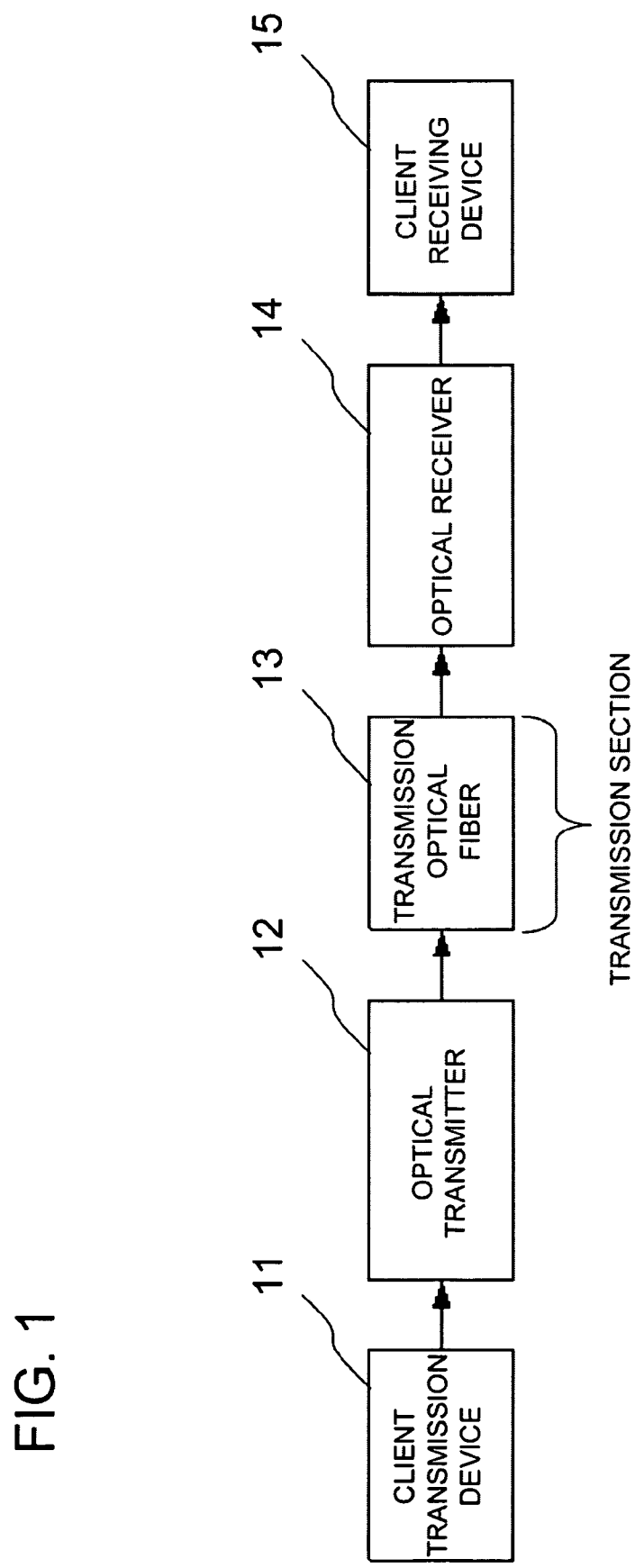
FIG. 1 is a drawing for describing a configuration of an optical signal division transmission system according to a first exemplary embodiment of the present invention.

Next, a detailed description of a preferred exemplary embodiment of the present invention is given, making reference to the drawings.
First Exemplary Embodiment FIG. 1 is a drawing for describing a configuration of an optical signal division transmission system according to a first exemplary embodiment of the present invention. Referring to FIG. 1, an optical transmitter 12 that divides an input optical signal (client signal) received from a client transmission device 11 into N parts (N is an integer greater than or equal to 1), to be outputted to a transmission optical fiber(s) 13, and an optical receiver 14 that receives and restores the client signal(s) divided into N parts, and that goes through the transmission optical fiber(s) 13, and outputs to a client receiving device 15. Note, the term "optical signal divided into N parts" may be termed as "N-part signals" or "N-part optical signals")

When a client signal is divided into N parts at a 1/N transmission rate to be transmitted by N optical wave paths, at least one additional optical wave path is arranged (as a standby path) between the abovementioned optical transmitter 12 and the optical receiver 14.

For example, it is possible to provide a structure (an error correction data transmission structure or mechanism) that transmits data divided into N parts and data obtained by correcting an error of the data divided into N parts, using N+1 or more optical wave paths including the additional (standby) optical wave path. Therefore, in case where a malfunction occurs in any of the N optical wave paths used for transmitting the N-part signals, it is possible to correct the malfunction within range of the error correction capability, and to normally transmit the client signal. Below, a description is given of a detailed configuration for realizing the abovementioned error correction function.

Figure 2:
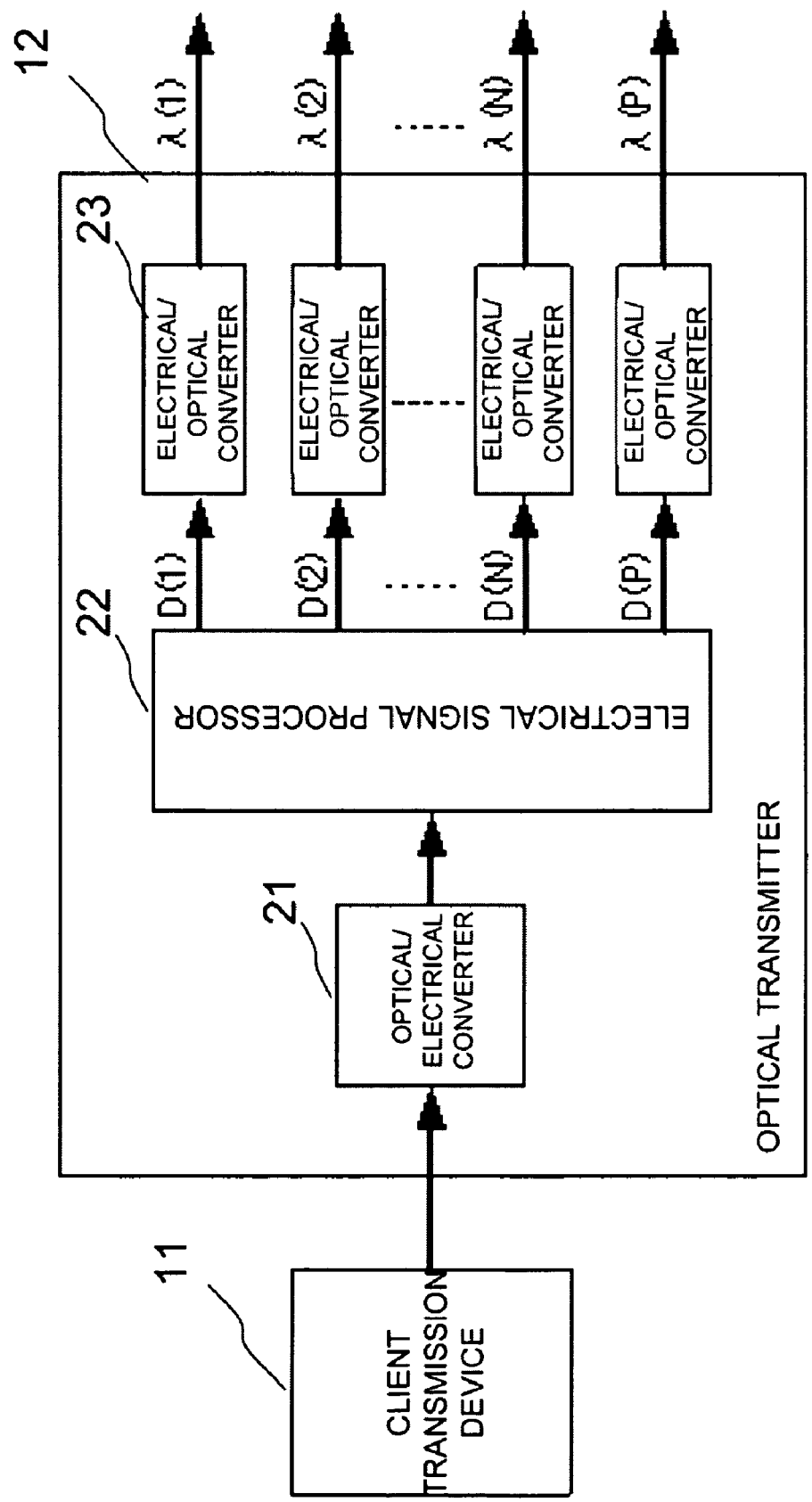
FIG. 2 is a drawing for describing a detailed configuration of an optical transmitter of FIG. 1.

FIG. 2 is a drawing showing a detailed configuration of the optical transmitter 12 according to the first exemplary embodiment of the present invention. FIG. 2 shows a configuration of the optical transmitter 12, which is provided with an optical/electrical (OIE) converter 21, an electrical signal processor (transmission side) 22, and electrical/optical (E/O) converters 23.

The optical/electrical converter 21 converts an input optical signal (client signal) received from the client transmission device 11, to an electrical signal, and outputs to the electrical signal processor 22.

The electrical signal processor 22 divides the client signal that has been converted into an electrical signal into N parts (N-part signals), and generates synchronous electrical signals $D(1)$ to $D(N)$ that have been synchronized according to synchronizing information, having a bit rate of 1/N, and an electrical signal $D(P)$ containing parities of $D(1)$ to $D(N)$ at the same timing, and outputs these electrical signals $D(1)$ to $D(N)$ and $D(P)$ to the electrical/optical converters 23.

The electrical/optical converters 23 convert the electrical signals $D(1)$ to $D(N)$ and $D(P)$, respectively, received from the electrical signal processor 22, into optical signals having prescribed wavelength components $\lambda(I)$ to $\lambda(N)$ and $\lambda(P)$, respectively.

The optical signals are wavelength-multiplexed by an optical wavelength multiplex processing unit (omitted from the drawings) arranged before the transmission optical fiber 13, or are received by the transmission optical fiber 13 as they are, and are transmitted to the optical receiver 14 side. In case where the (N-part) optical signals are wavelength-multiplexed, the wavelength-multiplexed optical signals are divided by the optical wavelength demultiplex processing unit (omitted from the drawings) arranged on the optical receiver 14 side, and processing is carried out to return the signals to the optical signals having the wavelength components $\lambda(1)$ to $\lambda(N)$ and $\lambda(P)$, respectively.

Figure 3:
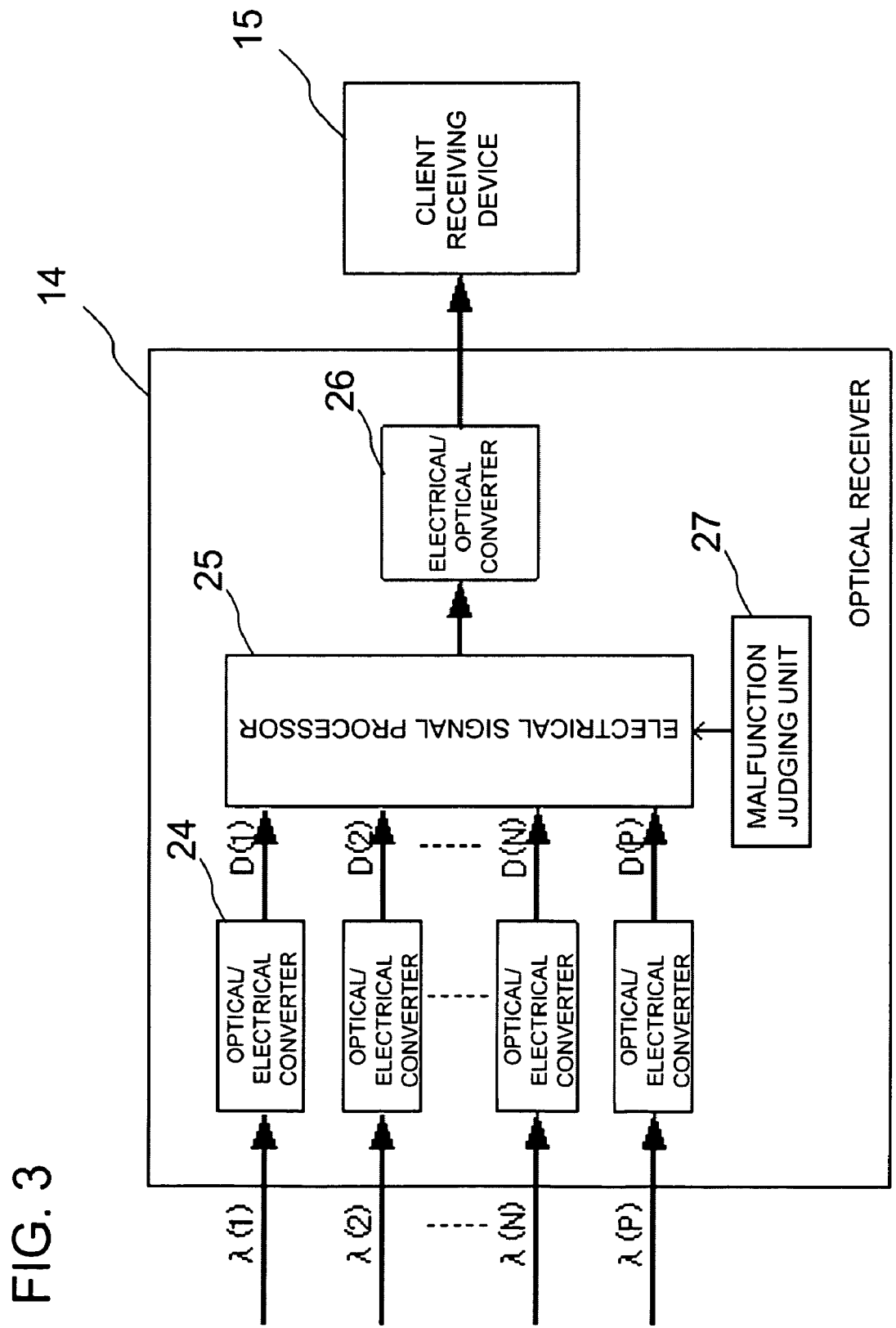
FIG. 3 is a drawing for describing a detailed configuration of an optical receiver of FIG. 1.

FIG. 3 is a drawing showing a detailed configuration of the optical receiver 14 according to the first exemplary embodiment of the present invention. FIG. 3 shows a configuration of the optical receiver 14, which is provided with optical/electrical converters 24, an electrical signal processor (receiver side) 25, an electrical/optical converter 26, and a malfunction judging unit 27.

The optical/electrical converters 24 convert optical signals having wavelength components λ(1) to λ(N) and λ(P) that were received, into electrical signals D(1) to D(N) and D(P), respectively, and output to the electrical signal processor 25.

The malfunction judging unit 27 monitors states of each of optical wave paths, and notifies the electrical signal processor 25 of any one of the optical wave paths that has a malfunction. For example, as in a wavelength multiplex optical transmission and receiving device described in Patent Document 3, when a laser installed in the electrical/optical converters 23 malfunctions, the malfunction judging unit 27 identifies an optical wave path where the malfunction has occurred, and notifies the electrical signal processor 25. The entire disclosure of Patent Document 3 is herein incorporated by reference thereto in this regard.

The electrical signal processor 25 multiplexes the synchronous electrical signals D(1) to D(N) received by the optical/electrical converters 24, respectively, restores the client signal, and outputs to the electrical/optical converter 26. Here, in case where there is no malfunction in any of the optical wave paths in which the synchronous electrical signals D(1) to D(N) are transmitted, the electrical signal D(P) containing the parities is not used (i.e., left as "stand-by" state).

On the other hand, in case where there is a malfunction in any of the optical wave paths in which the synchronous electrical signals D(1) to D(N) are transmitted, the electrical signal processor 25 restores an electrical signal (for example, D(M)) of an optical wave path that has a malfunction identified by the malfunction judging unit 27, using the electrical signal D(P) containing the parities, and after this, the synchronous electrical signals D(1) to D(N) including the electrical signal D(M) are multiplexed, and the client signal is restored and outputted to the electrical/optical converter 26.

The electrical/optical converter 26 converts the client signal restored by the electrical signal processor 25 to an optical signal of a specification determined by the client receiving device 15, and outputs to the client receiving device 15.

As described above, according to the optical signal division transmission system according to the present exemplary embodiment, even in case where the client signal is divided and a malfunction occurs in any one of the optical wave paths during transmission, it is possible to restore information concerning the optical wave path in which the malfunction in question has occurred, and, as a result, to transmit the client signal normally. Furthermore, in the present exemplary embodiment, since switching of the optical wave path is unnecessary, in comparison with Patent Document 3, when a malfunction occurs, it is possible to speedily restore the client signal.

In the abovementioned exemplary embodiment, the description has been given in which the optical wave path that transmits the wavelength component λ(P) is fixed, but, for example, a configuration can also be employed in which the optical wave path that transmits the wavelength component λ(P) is dispersed (or spread) according to a predetermined rule.

Second Exemplary Embodiment

Next, a description will be given concerning a second exemplary embodiment of the present invention in which a modification is added to the first exemplary embodiment as described above. A configuration of the present exemplary embodiment is similar to the first exemplary embodiment described using FIG. 2 and FIG. 3.

In the present exemplary embodiment, an arrangement is such that, in a normal operation state, a standby optical wave path is in an unused state, but when a malfunction occurs, an optical transmitter 12 switches to the standby optical wave path, and in such a manner it is possible to continue transmission of data of the optical wave path in which the malfunction has occurred.

For example, in case where a malfunction occurs in an optical wave path of a wavelength component λ(2) of FIG. 2 and FIG. 3, an electrical signal processor 22 of the optical transmitter 12 outputs an electrical signal D(2) corresponding to the wavelength component λ(2), to an electrical/optical converter 23 that outputs a wavelength component λ(P).

An optical receiver 14 extracts the electrical signal D(2) from the received wavelength component λ(P), in corresponding optical/electrical converter 24 which outputs an electrical signal D(2) to D(P), and multiplexes synchronous electrical signals D(1) to D(N) in an electrical signal processor 25, to restore a client signal.

In the present exemplary embodiment as described above, parity generation and restoration processing are unnecessary, and it is possible to simplify configuration of the electrical signal processors 22 and 25.

Preferred exemplary embodiments of the present invention have been described above, however, the present invention is not limited to the abovementioned exemplary embodiments, and further modifications, substitutions, and alterations can be added, within a scope that does not depart from the fundamental technological concept of the present invention. For example, in the abovementioned exemplary embodiments, a description was given in which an error correction was performed using parity, but it is also possible to provide an error correction function that uses other error correction data.

Furthermore, in the abovementioned exemplary embodiment, a description was given with one standby optical wave path, but it is also possible to provide two or more standby optical wave paths, and to improve error correction capability. Furthermore, in addition to transmitting data of the optical wave path in which the malfunction has occurred, as described in the abovementioned second exemplary embodiment, it is also possible to employ a configuration in which parity transmission as described in the abovementioned first exemplary embodiment is continued.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An optical signal division transmission system in which an input optical signal is divided into N parts that are termed as N-part optical signals and transmitted at a transmission rate of 1/N, wherein:

an additional optical wave path is provided separately from optical wave paths for transmitting said N-part optical signals;

even if a malfunction occurs in any one of said optical wave paths for transmitting said N-part optical signals, transmission of said N-part optical signals is continued, using said additional optical wave path; and the optical signal division transmission system comprises an error correction data transmission structure that transmits error correction data of said N-part optical signals, using said additional optical wave path, wherein an optical signal received via an optical wave path, in which a malfunction occurs, is corrected using said optical signal and said error correction data received via said additional optical wave path.

2. The optical signal division transmission system according to claim 1, comprising:
an optical wavelength multiplex processing unit which wavelength-multiplexes optical signals outputted from a transmission side, to be outputted to an optical transmission section, and
an optical wavelength demultiplex processing unit which demultiplexes optical signals received from said optical transmission section for each wavelength, to be received by a reception side, wherein
signal transmission through the optical transmission section is wavelength-multiplexed.

3. An optical transmitter of an optical signal division transmission system in which an input optical signal is divided into N parts that are termed as N-part optical signals and transmitted at a transmission rate of 1/N, said transmitter comprising:
an optical/electrical converter which converts said input optical signal to an electrical signal;
an electrical signal processor which divides said converted electrical signal into N parts of electrical signals (termed as "N-part electrical signals") and also generates error correction data for said N-part electrical signals; and
electrical/optical converters each of which converts each of said N-part electrical signals into the N-part optical signals, converts said error correction data into an optical signal, and outputs each of the N-part optical signals to a respective optical wave path, and outputs the error correction optical signal to an additional optical wave path that is provided separately from the optical wave paths for transmitting said N-part optical signals;
wherein on a reception side, an optical signal received via an optical wave path, in which a malfunction occurs, is corrected using said received optical signal and said error correction data received via said additional optical wave path.

4. The optical transmitter according to claim 3, comprising: an optical wavelength multiplex processing unit which wavelength-multiplexes optical signals outputted from said electrical/optical converters, to be outputted to an optical transmission section.

5. An optical receiver connected to said optical transmitter according to claim 3, via an optical transmission section, said receiver comprising:
a malfunction judging unit which judges a state of each of optical wave paths for receiving optical signals from said optical transmitter;
optical/electrical converters each of which converts optical signals received from said optical transmitter and error correction data, to electrical signals, respectively;
an electrical signal processor which multiplexes said converted electrical signals and restores an electrical signal equivalent to an input optical signal; and
an electrical/optical converter which converts said restored electrical signal into an optical signal; wherein
said electrical signal processor corrects an optical signal received in an optical wave path in which a malfunction occurs, using said optical signal and said error correction data signal received via said additional optical wave path.

6. The optical receiver according to claim 5, wherein
the signal received from said optical transmitter is wavelength-multiplexed, and
an optical wavelength demultiplex processing unit is provided which demultiplexes the signal received from said optical transmitter for every wavelength and outputs to said optical/electrical converters, respectively.

7. An optical signal division transmission method for an optical signal division transmission system comprising an optical transmitter which divides an input optical signal into N parts that are termed as N-part optical signals to be transmitted at a transmission rate of 1/N, and an optical receiver which receives optical signals transmitted from said optical transmitter, the method comprising:
dividing, by said optical transmitter, an input optical signal into N parts to provide N-part optical signals, and also a generating error correction data signal for said N-part optical signals, to be transmitted together with said N-part optical signals;
transmitting the N-part optical signals on respective optical wave paths;
transmitting the error correction data signal of said N-part optical signals using an additional optical wave path that is provided separately from optical wave paths for transmitting said N-part optical signals;
monitoring, by said optical receiver, a state of any of optical wave paths for receiving optical signals from said optical transmitter, and in case where a malfunction occurs in any of the optical wave paths for receiving the optical signals from said optical transmitter, correcting an optical signal received in the optical wave path in which the malfunction occurs using said optical signal and said error correction data signal received via said additional optical wave path; and
using, by said optical receiver, the optical signals received from said optical transmitter and, if appropriate, said error correction data signal, to multiplex restored N-part optical signals thereby to restore the input optical signals.

* * * * *